US006950521B1

(12) United States Patent
Marcovici et al.

(10) Patent No.: US 6,950,521 B1
(45) Date of Patent: Sep. 27, 2005

(54) METHOD FOR REPEATED AUTHENTICATION OF A USER SUBSCRIPTION IDENTITY MODULE

(75) Inventors: Michael Marcovici, Wheaton, IL (US); Semyon B Mizikovsky, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 907 days.

(21) Appl. No.: 09/592,337

(22) Filed: Jun. 13, 2000

(51) Int. Cl.⁷ .............................. H04K 1/00; H04L 9/00

(52) U.S. Cl. ....................... 380/249; 713/169; 713/170

(58) Field of Search ............................... 713/169, 170; 380/249

(56) References Cited

U.S. PATENT DOCUMENTS

| 5,153,919 | A | * | 10/1992 | Reeds et al. ................... 380/44 |
| 5,559,886 | A | | 9/1996 | Dent et al. ..................... 380/23 |
| 5,793,866 | A | * | 8/1998 | Brown et al. ................... 380/2 |
| 5,794,139 | A | * | 8/1998 | Mizikovsky et al. ........ 455/403 |
| 6,201,871 | B1 | * | 3/2001 | Bostley et al. .............. 380/249 |

FOREIGN PATENT DOCUMENTS

| DE | 197 30 301 C | 9/1998 | ............. H04L 9/32 |
| EP | 0 506 637 A | 9/1992 | ............. H04Q 7/04 |
| WO | WO 98/16080 | 4/1998 | ............. H04Q 7/38 |

OTHER PUBLICATIONS

Stallings, William; Crytography and Network Security; Jul. 4, 1998; Prentice Hall, Inc.; 2nd Edition; pp. 299-319.*
Stallings, William; Cryptography and Network Security; Jun. 4, 1998; Prentice Hall, Inc; 2nd Edition; pp. 237-269.*
Lee et al.; "Enhanced privacy and authentication for the global system for mobile communications"; 1999; J.C. Baltzer AG, Science Publishers; Wireless Networks 5; pp. 231-243.*
Brown, D., "A well designed P&A technique is necessary to protect assets—Techniques For Privacy And Authentication In Personal Communications Systems", IEEE Personal Communications, vol. 2, No. 4, Aug. 1, 1995, pp. 6-10.

* cited by examiner

*Primary Examiner*—Gilberto Barron
*Assistant Examiner*—Jung W Kim

(57) ABSTRACT

A method for improving an established Authentication and Key Agreement procedure which prevents rogue mobiles from fraudulently gaining access to a communication system. The communication system periodically broadcasts a challenge interrogation message requesting that a mobile, which is currently validated to use the system, to authenticate itself to the system. The mobile computes an authentication response based on information known only to the communication system and the USIM of the mobile and transmits said response to the communication system. The communication system also computes an authentication response and compares said response with that received from the mobile. A mobile is authenticated by the communication system when the two authentication responses are equal. Otherwise, the mobile is not given access to the communication system.

18 Claims, 1 Drawing Sheet

METHOD FOR REPEATED AUTHENTICATION OF A USER SUBSCRIPTION IDENTITY MODULE

BACKGROUND OF THE INVENTION

1. Field of the Invention

The present invention generally relates to security schemes used in communication system and more particularly to an improvement to a security scheme for the authentication of a portion of a mobile known as User Subscription Identity Modules.

2. Description of the Related Art

The security of information conveyed over communication systems is a main source of concern for service providers. Subscribers of communication systems many times transmit and receive very sensitive and private information intended for specific parties. Service providers want to give their subscribers a certain degree of confidence in the security capabilities of the communication system. Consequently, different security schemes have been developed and are being used in current communication systems. One security scheme, used particularly in third generation wireless communication systems, is referred to as the Authentication and Key Agreement (AKA) procedure. The AKA procedure is a security scheme that not only authenticates a subscriber and generates security keys, but it also validates received subscriber information to ensure that such information was not improperly modified at some point in the communication system prior to the reception of such information. Third generation wireless communication systems digital voice and relatively high speed data; these communication systems typically convey information in accordance with standards established by standards organizations such as the American National Standards Institute (ANSI) or the European Telecommunications Standards Institute (ETSI).

Referring now to FIG. 1, there is shown a portion of a wireless communication system. Communication link 102 couples Home Location Register (HLR) 100 to a base station 104 that is part of a Serving Network (SN). The SN is a communication system or part of a communication system that is providing services to subscribers. Base station 104 communicates with subscribers (e.g., mobile 108) via wireless communication link 106. For ease of illustration, only one base station of the SN is shown and also only one mobile is shown. HLR 100 is part of system equipment (owned and operated by the service provider) that performs mobility management for the communication system. Mobility management is the proper handling of subscriber traffic and the calculation of various parameters associated with the AKA procedure. For example, a mobility manager detects the initiation of call by a subscriber and also knows the subscriber's location and which base station is serving such a subscriber. The mobility manager can then inform the base station serving the subscriber making the call as to which base station the call is to be delivered.

HLR 100 contains subscriber specific data records including identification and authentication information for mobiles of all subscribers of the communication system. Base station 104 contains, inter alia, typical radio equipment for transmitting and receiving communication signals and other equipment for processing subscriber and system information. For example, base station 104 contains a Visitors Location Register (VLR) (not shown) which receives security related information from the HLR and derives additional security related information which is then transmitted to the proper mobile. The VLR also receives security related information from mobiles which it processes to authenticate communication between mobiles and the base station. The process of authentication is described herein in the discussion of the AKA procedure. Mobile 108 represents typical subscriber communication equipment (e.g., cell phone, wireless laptop pc) that transmits and receives system information and subscriber information to and from the base station. The system information is information that is generated system equipment to operate the communication system.

Mobile 108 has a User Subscription Identity Module (USIM) portion that is interfaced to the rest of the mobile equipment. The interface between the USIM and the mobile is standardized so that any USIM built in accordance with an interface standard can be used with any mobile equipment which is also configured in accordance with the same interface standard. Typically, the USIM is attached to the mobile as a storage device containing an ID number and other mobile identification data unique to a particular subscriber. Thus, part of the information stored in the HLR is also stored in the USIM. The USIM is capable of communicating with the rest of the mobile equipment commonly referred to as the shell or the mobile shell. Many publicly accessible mobiles (e.g., taxi cell phones) can be used by a subscriber inserting a USIM (also known as a "smart card") into the mobile. The information stored in the USIM is transferred to the mobile shell allowing the mobile to gain access to the communication system. Another type of arrangement between a USIM and a mobile shell is to integrate the USIM into the circuitry of the mobile shell. A mobile with an integrated USIM is typically owned by an individual subscriber and the communication system uses the information stored in a mobile's USIM to identify and confirm that the mobile has properly obtained access to the SN.

When a mobile wishes to gain access to a communication system, it must first be recognized as an authorized user of the communication system and then it executes an AKA procedure with the system equipment. As a result of the AKA procedure, the mobile's USIM generates two keys: (1) an Integrity Key (IK) used to compute digital signatures of information exchanged between the mobile and the base station. The digital signature computed with the IK is used to validate information integrity. The digital signature is a certain pattern which results when the proper IK is applied to any received information. The IK allows the authentication of information exchanged between the base station and the mobile; that is, the IK is applied to received information resulting in the generation of a digital signature indicating that the received information was not modified (intentionally or unintentionally) in any manner; (2) a ciphering key (CK) is used to encrypt information being transmitted over communication link 106 between base station 104 and mobile 108. Encryption of information with the ciphering key ensures privacy.

Both the IK and the CK are secret keys established between the base station and the mobile to establish a valid security association. A valid security association refers to a set of identical data patterns (e.g., IK, CK) independently generated by a USIM (coupled to a mobile) and a serving network indicating that the USIM is authorized to have access to the SN and the information received by the mobile from the SN is from an authorized and legitimate SN. A valid security association indicates that a mobile (i.e., the mobile's USIM) has authenticated itself to the SN and the SN has been authenticated by the mobile (i.e., the mobile's USIM). When the IK and CK—independently generated by the serving network and the mobile's USIM—are not identical, the security association is not valid. The determination of whether IK and CK computed at the SN are identical to the IK and CK computed at a USIM of a mobile is discussed infra. The USIM transfers the IK and CK to the mobile shell which uses them as described above. The IK and CK at the network are actually computed by the HLR. The HLR sends various information to the VLR and the mobile during an AKA procedure and generates, inter alia, the IK and CK, which it forwards to the VLR.

In a current standard (3GPP TSG 33.102) for third generation wireless communication systems, an authentication security scheme that uses an AKA procedure has been established. The information needed to execute the AKA procedure is contained in a block of information (stored in the HLR) called the Authentication Vector (AV). The AV is a block of information containing several parameters, namely: RAND, XRES, IK, CK and AUTN. Except for the AUTN and RAND parameters, each of the parameters is generated by the application of an algorithmic non-reversible function $f_n$ to RAND and a secret key, $K_i$. An algorithmic non-reversible function is a specific set of steps that mathematically manipulates and processes information such that the original information cannot be regenerated with the resulting processed information. There is actually a group of non-reversible algorithmic functions which are used to generate various parameters used in the AKA procedure; the various parameters and their associated functions are discussed infra. $K_i$ is a secret key associated with subscriber i (where i is an integer equal to 1 or greater) and which is stored in the HLR and in subscriber i's USIM. RAND is a random number uniquely specific to each AV and is selected by the HLR. XRES is the Expected Mobile Station Response computed by the USIM of a mobile by applying a non-reversible algorithmic function to RAND and $K_i$. IK is computed by the USIM and the HLR also by the application of a non-reversible algorithmic function to RAND and $K_i$. CK is also computed by both the USIM and the HLR by applying a non-reversible algorithmic function to RAND and $K_i$.

AUTN is an authentication token which is a block of information sent to the VLR by the HLR for authenticating the SN to the mobile. In other words, the AUTN contains various parameters some of which are processed by the USIM of the mobile to confirm that the AUTN was indeed transmitted by a legitimate base station of the SN. AUTN contains the following parameters: AK⊕SQN, AMF and MAC. AK is an Anonymity Key used for concealing the value of SQN which is a unique sequence vector that identifies the AV. AK is computed by applying a non-reversible algorithmic function to RAND and $K_i$. SQN, i.e., the Sequence Number, is independently generated by the USIM and the HLR in synchronized fashion. AMF is the Authentication Management Field whose specific values identify different commands sent from the HLR to the USIM. The AMF can be thought of as an in-band control channel. MAC, i.e., the Message Authentication Code, represents the signature of a message sent between the base station and the mobile which indicates that the message contains correct information; that is, the MAC serves to verify the content of messages exchanged between a mobile and the SN. For example, MAC=$f_n$(RAND, AMF, SQN, $K_i$) which is a signature of correct values of SQN and AMF computed with the use of non-reversible algorithmic function using a secret key $K_i$ and randomized by RAND.

For ease of explanation only, the AKA procedure will now be described in the context of a communication system part of which is shown in FIG. 1. The communication system shown in FIG. 1 complies with the 3GPP TSG33.102 standard. Initially, the AV is transferred from HLR 100 to the VLR at base station 104 (or to a VLR coupled to base station 104). In accordance with the standard, the VLR derives XRES from the received AV. The VLR also derives AUTN and RAND from the received AV and transfers them to mobile 108 via communication link 106. Mobile 108 receives AUTN and RAND and transfers the RAND and AUTN to its USIM. The USIM validates the received AUTN as follows: The USIM uses the stored secret key ($K_i$) and RAND to compute the AK, and then uncovers the SQN. The USIM uncovers the SQN by exclusive OR-ing the received AK⊕SQN with the computed value of $AK_j$; the result is the uncovered or deciphered SQN. Then the USIM computes the MAC and compares it to the MAC received as a part of the AUTN. If MAC checks, (ie. received MAC=computed MAC) the USIM verifies that the SQN is in a valid acceptable range (as defined by the standard), in which case the USIM considers this attempt at authentication to be a valid one. The USIM uses the stored secret key ($K_i$) and RAND to compute RES, CK and IK. The RES is a Mobile Station Response. The USIM then transfers IK, CK and RES to the mobile shell and causes the mobile to transmit (via communication link 106) RES to base station 104. RES is received by base station 104 which transfers it to the VLR. The VLR compares RES to XRES and if they are equal to each other, the VLR also derives the CK and IK keys from the Authentication Vector. Because of the equality of XRES to REST the keys computed by the mobile are equal to the keys computed by the HLR and delivered to the VLR.

At this point, a security association exists between base station 104 and mobile 108. Mobile 108 and base station 104 encrypt information conveyed over link 106 with key CK. Mobile 108 and base station 104 use key IK to authenticate information exchanged between them over communication link 106. Further, mobile 108 and base station 104 use IK to authenticate the subscriber/SN link established for mobile 108. The communication system uses the IK for authentication; that is, a proper value of IK from the mobile during communications implies that the mobile has properly gained access to the communication system and has been authorized by the communication system to use the resources (i.e., system equipment including communication links, available channels and also services provided by the SN) of the communication system (i.e., the SN). Thus, IK is used to authenticate the mobile to the SN. The use of IK to authenticate the mobile to the SN is called local authentication. Since base station 104 and mobile 108 already have a valid IK, it is simpler to use this valid IK instead of having to generate a new one requiring exchange of information between base station 104 and HLR 100 (i.e., intersystem traffic) that usually occurs when establishing a security association. In other words, once a subscriber gains access to a system and the subscriber's mobile has been authenticated, the IK and CK generated from the authentication process are used for information exchanged between the user's mobile and the base station and for authenticating the subscriber/SN link without having to re-compute an IK for each subsequent new session. Mobile shells, which comply with the standard established for the AKA procedure, will delete the IK and CK established from the authentication process once their USIM are detached. However, there are many rogue mobiles (unauthorized mobiles that manage to obtain access to a communication system) that do not comply with the requirements of the standard established for the AKA procedure. These rogue mobiles maintain the use of the IK and CK keys even when the USIM has been detached from them. Because of the use of the local authentication technique used in the currently established AKA procedure, the rogue mobiles are able to fraudulently use the resources of a communication system.

The following scenario describes one possible way in which a rogue mobile (e.g., a Taxi phone) can make fraudulent use of a communication system that uses the currently established AKA procedure. A subscriber inserts his or her USIM card into a Taxi phone to make a call. Once the mobile is authenticated as described above, the subscriber can make one or more calls. When all the calls are completed, the subscriber removes the USIM card from the Taxi phone. If the Taxi phone is in compliance with the standard, the phone will delete the CK and IK of the subscriber. However, if the Taxi phone is a rogue phone, it will not delete the CK and IK keys of the subscriber. Unbeknownst to the subscriber, the rogue phone is still authenticated (using local authentication based on IK) even when the subscriber has removed the USIM card. Thus, fraudulent calls can then be made on the rogue phone until the security association is renewed. Depending on the service provider, the security association can last for as long as 24 hours.

What is therefore needed is an improvement to the currently established AKA procedure that will eliminate the fraudulent use of a subscriber's authentication keys by a rogue mobile.

SUMMARY OF THE INVENTION

The present invention provides a method for an improved AKA procedure that prevents rogue mobiles from improperly and fraudulently use the resources of a communication system. Upon the establishment of a security association between a mobile and its base station, the method of the present invention allows the communication system to periodically challenge the authenticity of a mobile. The challenge may be a global challenge to all mobiles being served by the base station or the challenge can be a unique challenge to a specific mobile being served by the base station.

Regardless of the type of challenge presented by the base station, the mobile's USIM is able to compute an authentication response based on information available only to the mobile's USIM and the base station's VLR. The authentication response computed by the mobile's USIM is passed on to the mobile shell which transmits the authentication response to the base station. The received authentication response is then transferred to the base station's VLR which compares it to an authentication response independently computed by the VLR. The mobile is deemed authenticated when the VLR's authentication response is equal to the authentication response received from the mobile shell. In this manner, a security association resulting from the execution of an AKA procedure can be periodically validated with negligible impact on an already established AKA procedure. More importantly, the periodic authentication of a security association prevents rogue mobiles from fraudulently making use of the system resources. The method of the present invention also comprises the aperiodic or continuous or continual challenge of the authenticity of a mobile.

The method of the present invention performs the following steps:
An Authentication Vector (AV) is transmitted by the HLR to the VLR of the base station. The AV contains several parameters used in the execution of the AKA procedure including AK, and SQN. Whereas heretofore, AK was exclusive ORed (i.e., the operation denoted by "⊕") with SQN to protect SQN when it is transmitted over a publicly accessible communication link between the base station and the mobile, AK and SQN are now received by the VLR without being exclusive ORed to each other. Alternatively, the AK can be included in the Authentication Vector in addition to the value represented by an exclusive OR of the AK and the SQN. Thus, the VLR knows the value of AK. As in the prior art, the VLR transmits to the mobile the concealed SQN exclusive ORed with the AK as a portion of the AV called the AUTN to initiate the AKA procedure. A random number (RAND) generated by the VLR which is needed to initiate the AKA procedure is also transmitted by the VLR to the mobile. The AUTN is transferred from the mobile shell to the mobile's USIM. The USIM computes AK but does not transfer it to the mobile shell. The AKA procedure is executed resulting in a security association established between the mobile and the base station.

Upon the next access request, or any request by a mobile or the base station to make use of the communication system resources, a local authentication challenge is performed between the base station and the mobile. The local authentication challenge can also be performed during a session wherein the mobile is making use of the resources of the communication system. Specifically, the base station transmits a challenge interrogation message to the mobile requesting that the mobile authenticate itself to the base station. The challenge interrogation message can be a unique message intended for a particular mobile or it can be a global message requesting all mobiles being served by the base station to authenticate themselves to the base station. In response, the mobile's USIM computes a local authentication response ($AUTH_L$). $AUTH_L$ is computed by applying a non-reversible algorithmic function $f_n$ to AK, IK and a RANDU or $RAND_G$ parameter. The RANDU parameter (i.e., RANDom Unique number) is used when the challenge interrogation message is intended for a specific mobile. The $RAND_G$ parameter is used when the challenge is transmitted globally to all mobiles being served by the base station. The RANDU or the $RAND_G$ parameter is transmitted by the VLR as part of the challenge interrogation message. Upon transmission of the challenge interrogation message to a mobile, the VLR of the base station independently computes $AUTH_L$ also using IK, AK and RANDU or $RAND_G$.

The mobile transmits $AUTH_L$ to the base station in response to the challenge interrogation message. The $AUTH_L$ from the mobile is received by the base station and is transferred to the base station's VLR which compares the received $AUTH_L$ to the $AUTH_L$ it has computed independently. If the two $AUTH_L$'s are equal, the mobile's USIM is said to be authenticated rendering the security association valid. If the two $AUTH_L$'s are not equal, the security association is deemed invalid and the method of the present invention prevents the mobile from having access to the resources of the communication system.

DETAILED DESCRIPTION

Figure 1:
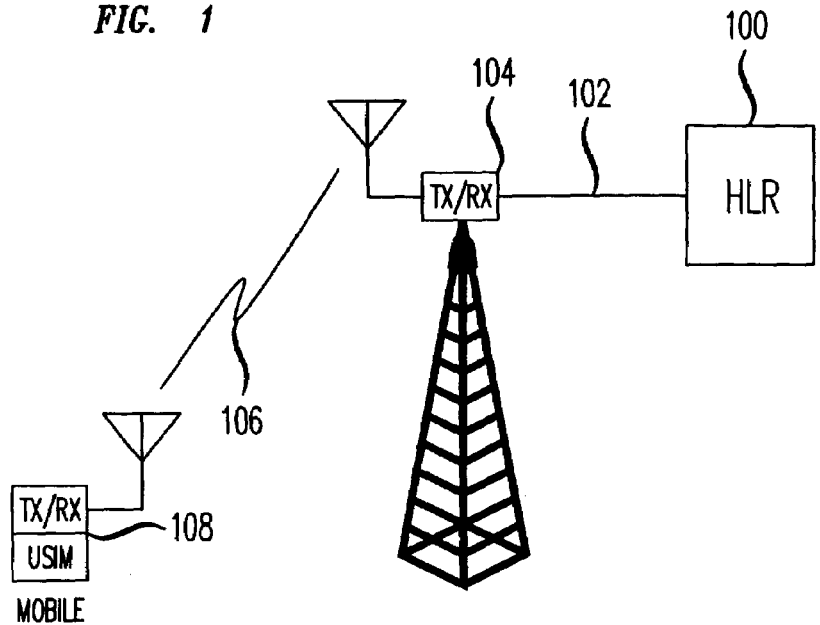
FIG. 1 depicts a portion of a wireless communication system.
Figure 2:
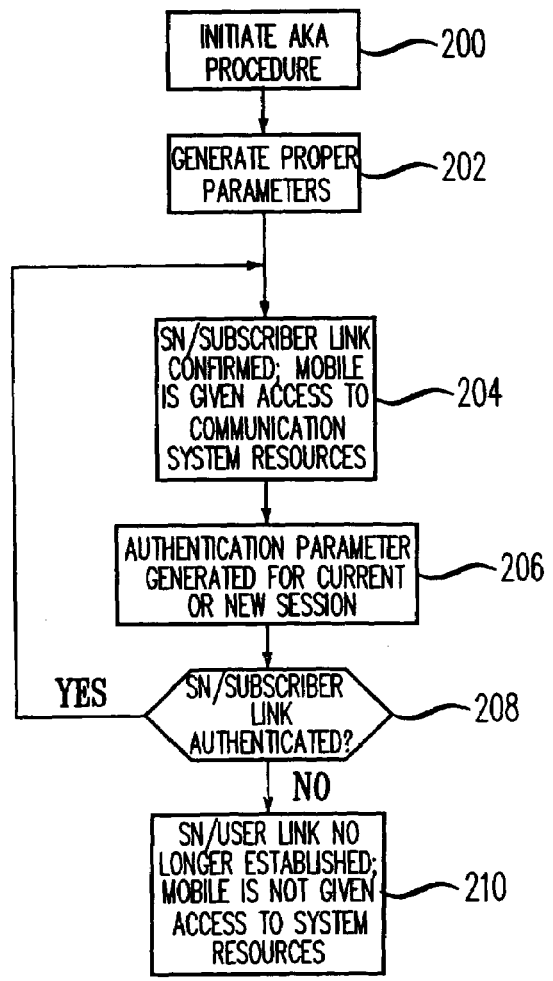
FIG. 2 shows the steps of the method of the present invention.

Referring to FIG. 2, there is shown the steps of the method of the present invention which will now be described in the context of FIG. 1. The method of the present invention applies to the AKA scheme defined by the 3GPP TSG 3.102 standard and to other standards that use an AKA scheme. For example, the method applies to various communication systems whose architectures are defined by the ANSI-41 standard. Such communication systems include but are not limited to Wide band CDMA systems (W-CDMA), TDMA (Time Division Multiple Access) systems, UMTS (Universal Mobile Telecommunications System) and third generation GSM (Global System for Mobile communications) systems defined by ETSI. In step 200, the AKA procedure is initiated; this procedure is initiated either when a mobile (e.g., 108) wants access to the service network or the service network has received a call for mobile 108 and wants to set up a call between the mobile and another party. In any event, in step 200, HLR 100 transmits an AV signal over system link 102 to Base Station 104. A VLR (not shown) at base station 104 receives the AV over communication link 102 which is not accessible to any subscribers of the communication system. The AV, which normally contains several parameters including AK$\oplus$SQN, is now sent with a clear value for AK. Unlike in the prior art where the base station receives the AV containing a ciphered combination of SQN and AK (i.e., AK$\oplus$SQN), the method of the present invention allows the VLR to know the individual value of AK by allowing the HLR to transfer AK to the base station (i.e., the VLR) in the clear. In other words, AK is no longer exclusive ORed with SQN as required by the current AKA procedure. Alternatively, AK$\oplus$SQN and AK can both be sent to the VLR from the HLR. Thus, once the VLR at base station 104 receives the AV from HLR 100, the VLR stores the value of AK.

The AV, which in addition to other parameters contains SQN, AK, MAC and AMF, is received by the base station's VLR which masks the SQN with the AK thus assembling the ciphered value of the SQN. This ciphered SQN is transmitted by the base station as part of the AUTN signal along with a RAND signal to mobile 108. In particular, the VLR ciphers the SQN (i.e., performs AK$\oplus$SQN) thus disguising the AK, completes assembly of the AUTN, and transmits the authentication request as an AUTN signal along with a RAND signal to mobile 108. Mobile 108 transfers the received AUTN along with the RAND signal to its USIM for validation and generation of security parameters which define the establishment of a security association.

In step 202, the parameters IK and CK are generated by the USIM as in the prior art. In particular, the USIM generates RES from $f_2$ (RAND, $K_i$); note that $f_2$ is also used in generating XRES. The USIM generates IK from the computation $f_3$(RAND, $K_i$), generates CK from the computation $f_4$(RAND, $K_i$) and AK from the computation $f_5$(RAND, $K_i$). It will be readily understood that the set of non-reversible algorithmic functions used to compute the parameters is chosen as per the communication standard being followed by the communication system. The particular non-reversible algorithmic functions used to describe the computation of certain parameters, however, may or may not be consistent with the dictates of the standard. Further, the USIM computes the expected value of the MAC (using the $f_1$ function) and compares it to the value received in the AUTN. If the MAC is valid, the USIM deciphers individual values of AK and SQN and verifies that the SQN value is in an acceptable range. Also, in step 202, the VLR receives the IK, CK and XRES from the HLR where these parameters were computed in the same manner as the USIM. The USIM transfers RES, CK, and IK to the shell of mobile 108. Mobile 108 transmits RES to the base station 104 which transfers it to its VLR.

In step 204, the VLR compares the received RES to the calculated XRES and if RES=XRES then the CK and IK at the VLR are the same as the CK and IK at the mobile and USIM. A valid security association has now been established and confirmed for the Subscriber/SN link (i.e., link 106) for a certain duration of a session. The authenticity of the mobile is thus established meaning that the mobile has properly gained access to the SN by obtaining the proper authorization from the SN to user the resources of the SN. The session refers to the length of time elapsed during the authentication process, access given to the subscriber, and the subscriber making use of the resources. For example, a session can be the time elapsed during a telephone call encompassing the time it takes to set up the call as per the standard being followed by the communication system, the time it takes for the system to give the subscriber access to the communication system and the amount of time used by the subscriber in making use of the resources of the communication system by engaging in communications (e.g., voice call) with another party.

In step 206, at some time during the session, the VLR at base station 104 will challenge the authenticity of the established security association by broadcasting a challenge interrogation message. In particular, whether mobile 108 has obtained authorization from the system to transmit and receive information to and from base station 104 via communication link 106 is being challenged; that is, the authorization for the subscriber/serving network link (i.e., information exchanged over communication link 106) is being challenged. The challenge interrogation message can be a global challenge in which case the message is broadcast to all the mobiles being served by the base station. Alternatively, the challenge interrogation message can be a unique message intended for a specific mobile being served by the base station. The challenge interrogation message is transmitted by the VLR periodically, aperiodically, continually or continuously during a session. The challenge interrogation messaged can also be transmitted at the beginning of each session after a security association has been established. The challenge interrogation message is the initiation of a local authentication between mobile 108 and the SN. The challenge interrogation message contains a random number (i.e., RANDG for a global challenge or RANDU for a unique challenge) which is generated by the VLR at base station 104. The particular format of the challenge interrogation message depends on the format defined the standard with which the communication system complies. Mobile 108 receives the random number and transfers said number to its USIM. The USIM applies a non-reversible algorithmic function to the IK, AK parameters and the random number (i.e., $RAND_G$ or RANDU) to compute a local authentication response called $AUTH_L$. In particular, for a global challenge $AUTH_L = f_n(RAND_G, AK)_{IK}$ and for a unique challenge $AUTH_L = f_n(RANDU, AK)_{IK}$. The non-reversible algorithmic function used to compute $AUTH_L$ can be any one from the group of function (f, where n is an integer equal to 1 or greater) defined by the standard being followed by the communication system. The VLR at base station 104 independently computes $AUTH_L$ in the same manner. Because AK is known only to the VLR and the USIM, the $AUTH_L$ cannot be computed by a rogue phone since such a phone does not have access to AK; thus the local authentication is performed on information (i.e., AK) known only to the SN and the mobile's USIM. The authentication response (AUTH$_L$) computed by the USIM is transferred to the mobile shell which transmits it (e.g., by attaching it to messages transmitted to the base station) to base station 104. Base station 104 transfers the received AUTH$_L$ to the VLR which compares it to its independently computed AUTH$_L$.

In an alternative embodiment of the method of the present invention, the USIM of mobile 108 transfers AUTH$_L$ to the shell of mobile 108. The mobile shell computes a parameter called a MAC-I using IK and AUTH$_L$. The mobile shell then transmits MAC-I to the base station which transfers MAC-I to the VLR. The VLR, which independently computes its own MAC-I (also using IK and AUTH$_L$), and compares it to the received MAC-I. Thus, MAC-I is used for the dual purposes of local authentication and to validate content of information exchanged between the mobile and the SN. By using MAC-I, there is no need to attach AUTH$_L$ to messages.

In step 208, the session and the mobile (i.e., the mobile's USIM) are authenticated if the two AUTH$_L$'s (or MAC-I's) are equal; that is, when the AUTH$_L$ (or MAC-I) computed by the VLR is equal to the AUTH$_L$ (or MAC-I) received from mobile 108 and computed by the mobile's USIM. The VLR thus confirms the authenticity of an already established link (i.e., SN/Subscriber link established) between mobile 108 and base station 104 or allows a link to be established; that is, the method of the present invention has now moved back to step 204. The mobile is given access to the resources of the communication system, or in the case of an already established link, the mobile continues to have access to the resources of the communication system. If the VLR cannot authenticate the SN/Subscriber link (i.e., received AUTH$_L$ or MAC-I is not equal to AUTH$_L$ or MAC-I calculated by VLR), the method of the present invention moves to step 210 wherein the mobile is prevented from having access to the SN; that is, the link is dropped and the CK and IK associated with the link are no longer accepted by the SN (i.e., base station 104). The security association is no longer valid and the mobile is not given access to the resources of the communication system. Therefore, a rogue mobile, which has no USIM is not able to authenticate itself to the communication system and thus is not able to fraudulently make use of the resources of the communication system.

We claim:

1. A method of authenticating a user identity module communicatively coupled with a mobile shell having an established security association with a server network, the method comprising:
   receiving a first message from the mobile shell;
   determining a second message based upon the first message and a first key known to the server network and unknown to the mobile shell; wherein the first key is generated during the establishment of the security association; and
   providing the second message to the server network.

2. The method of claim 1, wherein receiving the first message from the mobile shell comprises receiving the first message in response to a challenge interrogation message provided by the server network.

3. The method of claim 2, wherein receiving the first message in response to the challenge interrogation message comprises receiving the first message from the mobile shell in response to at least one of a unique challenge interrogation message and a global challenge interrogation message.

4. The method of claim 2, wherein receiving the first message comprises receiving a random number provided by the server network.

5. The method of claim 4, wherein determining the second message comprises applying a non-reversible algorithmic function to the random number and the first key known to the server network and not known to the mobile shell.

6. The method of claim 1, wherein receiving the first message from the mobile shell comprises receiving a first message formed by the mobile shell using a third message and a second key known to the mobile shell and the server network.

7. The method of claim 6, wherein receiving the first message from the mobile shell comprises receiving the first message formed by the mobile shell using a third message and an integrity key known to the mobile shell and the server network.

8. The method of claim 1, wherein providing the second message to the server network comprises providing the second message to the mobile shell, and wherein the mobile shell is configured to provide at least the second message to the server network.

9. The method of claim 1, wherein determining the second message based upon the first key known to the server network and not known to the mobile shell comprises determining the second message based upon an anonymity key known to the server network and not known to the mobile shell.

10. A method of authentication by a server network having an established security association with a mobile shell communicatively coupled with a user identity module, the method comprising:
    establishing a security association with the mobile shell;
    receiving a first message from the mobile shell; and
    authenticating the mobile shell based upon the first message and a first key known to the user identity module and unknown to the mobile shell; and wherein the first key is generated during the establishment of the security association.

11. The method of claim 10, wherein receiving the first message from the mobile shell comprises:
    providing a second message to the mobile shell after the security association has been established; and
    receiving the first message in response to the second message.

12. The method of claim 11, wherein providing the second message comprises providing at least one of a unique challenge interrogation message and a global challenge interrogation message.

13. The method of claim 11, wherein providing the second message comprises providing a random number.

14. The method of claim 13, wherein receiving the first message comprises receiving a first message formed by the user identity module based upon the random number and the first key known to the user identity module and not known to the mobile shell.

15. The method of claim 11, wherein authenticating the mobile shell based upon the first message and the first key known to the user identity module and not known to the mobile shell comprises:
    determining a fifth message based upon a portion of the second message and the first key known to the user identity module and not known to the mobile shell;
    comparing the first message and the fifth message; and
    authenticating the mobile shell when a portion of the first message is equal to a portion of the fifth message.

16. The method of claim 15, wherein determining the fifth message comprises applying a non-reversible algorithmic function to the portion of the second message and the first key known to the user identity module and not known to the mobile shell.

17. At the method of claim 10, wherein receiving the first message comprises receiving a third message formed by the user identity module based upon the first key and a fourth message formed by the mobile shell using a second key known to the mobile shell.

18. The method of claim 17, wherein authenticating the mobile shell based upon the first message and the first key known to the user identity module and not known to the mobile shell comprises:

generating a sixth message based upon the first and second keys; and comparing the first message and the sixth message; and authenticating the mobile shell when a portion of the first message is equal to a portion of the sixth message.

* * * * *